United States Patent
Ly et al.

(10) Patent No.: US 10,728,885 B2
(45) Date of Patent: Jul. 28, 2020

(54) TECHNIQUES AND APPARATUSES FOR CONFIGURING AN UPLINK BANDWIDTH PART FOR A RANDOM ACCESS CHANNEL (RACH) PROCEDURE

(71) Applicant: QUALCOMM Incorporated, San Diego, CA (US)

(72) Inventors: Hung Dinh Ly, San Diego, CA (US); Peter Pui Lok Ang, San Diego, CA (US); Peter Gaal, San Diego, CA (US); Tao Luo, San Diego, CA (US); Heechoon Lee, San Diego, CA (US); Muhammad Nazmul Islam, Edison, NJ (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 16 days.

(21) Appl. No.: 16/141,048

(22) Filed: Sep. 25, 2018

(65) Prior Publication Data

US 2019/0124646 A1 Apr. 25, 2019

Related U.S. Application Data

(60) Provisional application No. 62/577,155, filed on Oct. 25, 2017.

(51) Int. Cl.
| | |
|---|---|
| *H04W 72/04* | (2009.01) |
| *H04L 5/00* | (2006.01) |
| *H04W 74/00* | (2009.01) |
| *H04W 74/08* | (2009.01) |

(52) U.S. Cl.
CPC ....... *H04W 72/0413* (2013.01); *H04L 5/0007* (2013.01); *H04W 74/006* (2013.01); *H04W 74/0833* (2013.01)

(58) Field of Classification Search
CPC ............ H04W 72/0413; H04W 74/006; H04L 5/0007
See application file for complete search history.

(56) References Cited

U.S. PATENT DOCUMENTS

| | | | |
|---|---|---|---|
| 2018/0049047 A1* | 2/2018 | Lin | H04W 24/02 |
| 2018/0049169 A1* | 2/2018 | Lin | H04L 5/0051 |
| 2018/0183551 A1* | 6/2018 | Chou | H04W 72/1268 |
| 2018/0376511 A1* | 12/2018 | Tsai | H04W 74/0833 |
| 2019/0044689 A1* | 2/2019 | Yiu | H04L 5/0098 |
| 2019/0045549 A1* | 2/2019 | Wu | H04W 36/0055 |
| 2019/0053029 A1* | 2/2019 | Agiwal | H04W 76/28 |

(Continued)

OTHER PUBLICATIONS

Ericsson; "On bandwidth parts"; R1-1718839; 3GPP TSG-RAN WG1 #89 Hanqzhou, China, May 15-19, 2017 (Year: 2017).*

(Continued)

*Primary Examiner* — Gary Mui
(74) *Attorney, Agent, or Firm* — Harrity & Harrity LLP

(57) ABSTRACT

Various aspects of the present disclosure generally relate to wireless communication. In some aspects, a user equipment (UE) may receive remaining minimum system information (RMSI) from a base station (BS); determine an initial active uplink bandwidth part based at least in part on the RMSI; and use the initial active uplink bandwidth part for a random access channel (RACH) procedure between the UE and the BS. Numerous other aspects are provided.

30 Claims, 14 Drawing Sheets

(56) References Cited

U.S. PATENT DOCUMENTS

| | | | |
|---|---|---|---|
| 2019/0053182 A1* | 2/2019 | Choi | H04W 56/0045 |
| 2019/0059112 A1* | 2/2019 | Ou | H04W 74/0833 |
| 2019/0182716 A1* | 6/2019 | Futaki | H04W 28/20 |
| 2019/0280843 A1* | 9/2019 | Jeon | H04L 5/0053 |

OTHER PUBLICATIONS

MediaTek Inc.; "Summary of Bandwidth Part Operation"; R1-1718839; 3GPP TSG RAN WG1 Meeting 90bis Prague, CZ, Oct. 9-13, 2017 (Year: 2017).*

International Search Report and Written Opinion—PCT/US2018/052777—ISA/EPO—dated Nov. 28, 2018.

Mediatek Inc: "Discussion on RMSI Transmission", 3GPP Draft, R1-1716205, 3rd Generation Partnership Project (3GPP), Mobile Competence Centre, 650, Route Des Lucioles, F-06921 Sophia-Antipolis Cedex, France, vol. RAN WG1, No. Nagoya, Japan, Sep. 18, 2017-20178921, Sep. 12, 2017, XP051329827, Retrieved from the Internet: URL:http://www.3gpp.org/ftp/tsg_ran/WG1_RL1/TSGR_AH/NR_AH1_1709/Docs, pp. 1-2.

Mediatek Inc: "Further Discussion on RMSI Transmission", 3GPP Draft, R1-1718330, 3rd Generation Partnership Project (3GPP), Mobile Competence Centre, 650, Route Des Lucioles, F-06921 Sophia-Antipolis Cedex, France, vol. RAN WG1, No. Prague, CZ, Oct. 9, 2017-Oct. 13, 2017, Oct. 8, 2017 (Oct. 8, 2017), XP051341513, Retrieved from the Internet: URL:http://www.3gpp.org/ftp/Meetings_3GPP_SYNC/RAN1/Docs/, pp. 1-3.

Mediatek Inc: "Remaining Details on Bandwidth Part Operation in NR", 3GPP Draft, R1-1716202, 3rd Generation Partnership Project (3GPP), Mobile Competence Centre, 650, Route Des Lucioles, F-06921 Sophia-Antipolis Cedex, France, vol. RAN WG1, No. Nagoya, Japan; Sep. 18, 2017-Sep. 2, 2017, Sep. 17, 2017 (Sep. 17, 2017), XP051339660, Retrieved from the Internet: URL:http://www.3gpp.org/ftp/Meetings_3GPP_SYNC/RAN1/Docs/, 9 Pages.

* cited by examiner

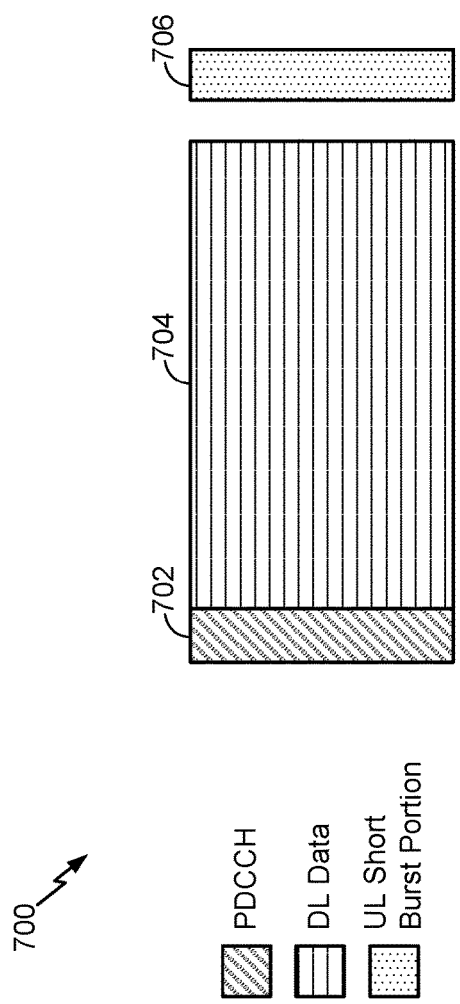
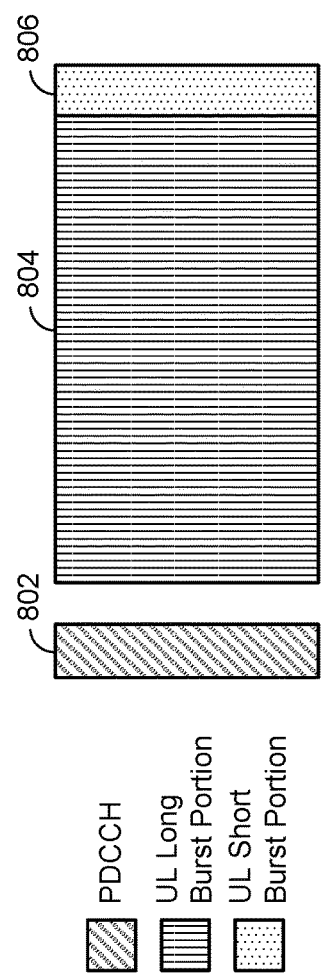

TECHNIQUES AND APPARATUSES FOR CONFIGURING AN UPLINK BANDWIDTH PART FOR A RANDOM ACCESS CHANNEL (RACH) PROCEDURE

CROSS-REFERENCE TO RELATED APPLICATIONS UNDER 35 U.S.C. § 119

This application claims priority to Provisional Patent Application No. 62/577,155, filed on Oct. 25, 2017, entitled "TECHNIQUES AND APPARATUSES FOR CONFIGURING AN UPLINK BANDWIDTH PART FOR A RANDOM ACCESS CHANNEL (RACH) PROCEDURE," which is hereby expressly incorporated by reference herein.

FIELD OF THE DISCLOSURE

Aspects of the present disclosure generally relate to wireless communication, and more particularly to techniques and apparatuses for configuring an uplink bandwidth part for a random access channel (RACH) procedure.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication, performed by a user equipment (UE), may include identifying a physical resource block (PRB) frequency location of an initial active uplink bandwidth part based at least in part on remaining minimum system information (RMSI) received from a base station (BS), the initial active uplink bandwidth part to be used for a random access channel (RACH) procedure between the UE and the BS; and using an uplink PRB grid, established based at least in part on the physical resource block of the initial active uplink bandwidth part, for the RACH procedure between the UE and the BS.

In some aspects, a user equipment for wireless communication may include memory and one or more processors operatively coupled to the memory. The memory and the one or more processors may be configured to identify a physical resource block (PRB) frequency location of an initial active uplink bandwidth part based at least in part on remaining minimum system information (RMSI) received from a base station (BS), the initial active uplink bandwidth part to be used for a random access channel (RACH) procedure between the UE and the BS; and use an uplink PRB grid, established based at least in part on the physical resource block of the initial active uplink bandwidth part, for the RACH procedure between the UE and the BS.

In some aspects, a non-transitory computer-readable medium may store one or more instructions for wireless communication. The one or more instructions, when executed by one or more processors of a user equipment, may cause the one or more processors to identify a physical resource block (PRB) frequency location of an initial active uplink bandwidth part based at least in part on remaining minimum system information (RMSI) received from a base station (BS), the initial active uplink bandwidth part to be used for a random access channel (RACH) procedure between the UE and the BS; and use an uplink PRB grid, established based at least in part on the physical resource block of the initial active uplink bandwidth part, for the RACH procedure between the UE and the BS.

In some aspects, an apparatus for wireless communication may include means for identifying a physical resource block (PRB) frequency location of an initial active uplink bandwidth part based at least in part on remaining minimum system information (RMSI) received from a base station (BS), the initial active uplink bandwidth part to be used for a random access channel (RACH) procedure between the apparatus and the BS; and means for using an uplink PRB grid, established based at least in part on the physical resource block of the initial active uplink bandwidth part, for the RACH procedure between the apparatus and the BS.

In some aspects, a method for wireless communication, performed by a base station (BS), may include transmitting, to a user equipment (UE), a random access channel (RACH) configuration within remaining minimum system information (RMSI), the RACH configuration to be used to establish an initial active uplink bandwidth part for the UE, the initial active uplink bandwidth part to be used for a RACH procedure between the BS and the UE; and establishing an uplink physical resource block (PRB) grid for the RACH procedure based at least in part on the initial active uplink bandwidth part.

In some aspects, a base station (BS) for wireless communication may include memory and one or more processors operatively coupled to the memory. The memory and the one or more processors may be configured to transmit, to a user equipment (UE), a random access channel (RACH) configuration within remaining minimum system information (RMSI), the RACH configuration to be used to establish an initial active uplink bandwidth part for the UE, the initial active uplink bandwidth part to be used for a RACH procedure between the BS and the UE; and establish an uplink physical resource block (PRB) grid for the RACH procedure based at least in part on the initial active uplink bandwidth part.

In some aspects, a non-transitory computer-readable medium may store one or more instructions for wireless communication. The one or more instructions, when executed by one or more processors of a base station (BS), may cause the one or more processors to transmit, to a user equipment (UE), a random access channel (RACH) configuration within remaining minimum system information (RMSI), the RACH configuration to be used to establish an initial active uplink bandwidth part for the UE, the initial active uplink bandwidth part to be used for a RACH procedure between the BS and the UE; and establish an uplink physical resource block (PRB) grid for the RACH procedure based at least in part on the initial active uplink bandwidth part.

In some aspects, an apparatus for wireless communication may include means for transmitting, to a user equipment (UE), a random access channel (RACH) configuration within remaining minimum system information (RMSI), the RACH configuration to be used to establish an initial active uplink bandwidth part for the UE, the initial active uplink bandwidth part to be used for a RACH procedure between the apparatus and the UE; and means for establishing an uplink physical resource block (PRB) grid for the RACH procedure based at least in part on the initial active uplink bandwidth part.

In some aspects, a method for wireless communication, performed by a user equipment (UE), may include receiving remaining minimum system information (RMSI) from a base station (BS); determining an initial active uplink bandwidth part based at least in part on the RMSI; and using the initial active uplink bandwidth part for a random access channel (RACH) procedure between the UE and the BS.

In some aspects, a user equipment for wireless communication may include memory and one or more processors operatively coupled to the memory. The memory and the one or more processors may be configured to receive remaining minimum system information (RMSI) from a base station (BS); determine an initial active uplink bandwidth part based at least in part on the RMSI; and use the initial active uplink bandwidth part for a random access channel (RACH) procedure between the UE and the BS.

In some aspects, a non-transitory computer-readable medium may store one or more instructions for wireless communication. The one or more instructions, when executed by one or more processors of a user equipment (UE), may cause the one or more processors to receive remaining minimum system information (RMSI) from a base station (BS); determine an initial active uplink bandwidth part based at least in part on the RMSI; and use the initial active uplink bandwidth part for a random access channel (RACH) procedure between the UE and the BS.

In some aspects, an apparatus for wireless communication may include means for receiving remaining minimum system information (RMSI) from a base station (BS); means for determining an initial active uplink bandwidth part based at least in part on the RMSI; and means for using the initial active uplink bandwidth part for a random access channel (RACH) procedure between the apparatus and the BS.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example of a downlink (DL)-centric subframe, in accordance with various aspects of the present disclosure.

FIG. 8 is a diagram illustrating an example of an uplink (UL)-centric subframe, in accordance with various aspects of the present disclosure.

DETAILED DESCRIPTION

Figure 1:
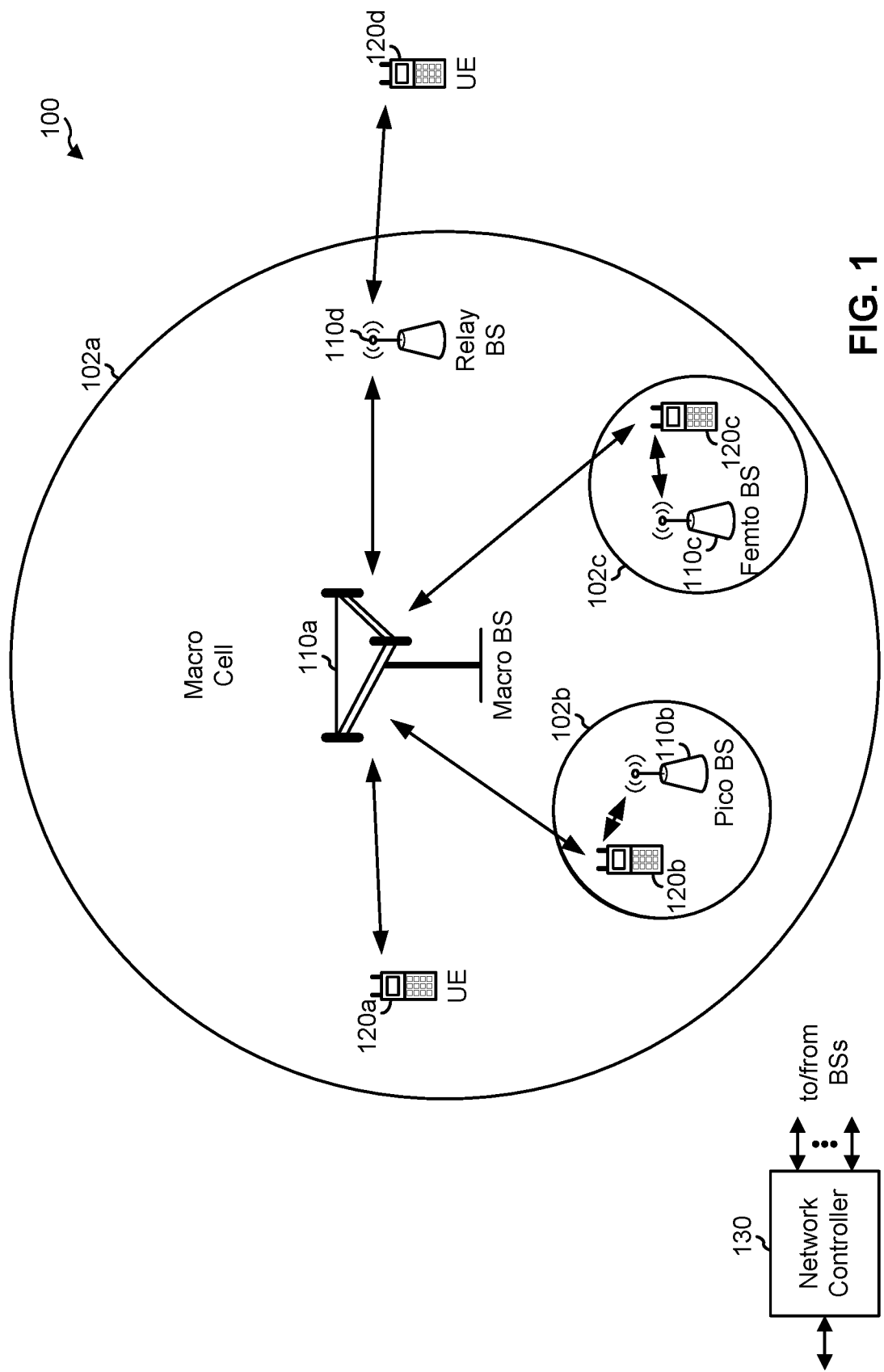
FIG. 1 is a block diagram conceptually illustrating an example of a wireless communication network, in accordance with various aspects of the present disclosure.

In certain communications systems, such as 5G, NR, and/or the like, bandwidth parts may be configured for a user equipment (UE). A UE may use a particular bandwidth part of a plurality of available bandwidth parts for communication with a base station (BS). The UE may perform uplink communications via the plurality of available bandwidth parts for communication with the BS. However, the UE may utilize excessive power resources when using the plurality of bandwidth parts. Furthermore, various types of UEs may have various types of bandwidth capabilities. Additionally, particular bandwidth parts may become overloaded (e.g., during RACH procedures).

Some aspects, described herein, may configure an initial active uplink bandwidth part (rather than a full available bandwidth) for a RACH procedure between a UE and a BS. For example, a UE may identify a physical resource block (PRB) frequency location of an initial active uplink bandwidth part based at least in part on remaining minimum system information (RMSI) received from a BS. The initial active uplink bandwidth part may be used for a random access channel (RACH) procedure between the UE and the BS. The UE may use an uplink PRB grid, established based at least in part on the physical resource block of the initial active uplink bandwidth part, for the RACH procedure between the UE and the BS. Additionally, or alternatively, in some aspects, a BS may transmit, to a UE, a random access channel (RACH) configuration within remaining minimum system information (RMSI). The RACH configuration may be used to establish an initial active uplink bandwidth part for the UE. The initial active uplink bandwidth part may be used for a RACH procedure between the BS and the UE. The BS may establish an uplink physical resource block (PRB) grid for the RACH procedure based at least in part on a PRB frequency location of the initial active uplink bandwidth part.

Accordingly, in some aspects herein, an initial active uplink bandwidth part may be used for a RACH procedure when a UE is powered on, enters a coverage area of the BS, and/or the like. Therefore, rather than using a plurality of bandwidth parts or a full available bandwidth for a RACH procedure with a BS, which may result in excessive use of power resources, the UE may conserve power resources by utilizing a single bandwidth part for the RACH procedure. For example, using part of the initial active uplink bandwidth enables the UE to use less transmission power for the RACH procedure (e.g., because less of the bandwidth is used). Furthermore, the UE may use a bandwidth part that corresponds to the particular capabilities of the UE. Also, load balancing may be performed across uplink bandwidth parts (e.g., based at least in part on BS instructions and configurations of the UL bandwidth parts) to ensure that one or more uplink bandwidth parts do not become overloaded.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, an initial active uplink bandwidth part for communication between BS 110 and UE 120 may be configured and used for a RACH procedure to establish an uplink PRB grid. For example, UE 120 may identify a physical resource block (PRB) frequency location of an initial active uplink bandwidth part based at least in part on remaining minimum system information (RMSI) received from BS 110. The initial active uplink bandwidth part may be used for a random access channel (RACH) procedure between UE 120 and BS 110. UE 120 may use an uplink PRB grid, established based at least in part on the physical resource block of the initial active uplink bandwidth part, for the RACH procedure between UE 120 and BS 110. Additionally, or alternatively, BS 110 may transmit, to UE 120, a random access channel (RACH) configuration within remaining minimum system information (RMSI). The RACH configuration may be used to establish an initial active uplink bandwidth part for UE 120. The initial active uplink bandwidth part may be used for a RACH procedure between BS 110 and UE 120. BS 110 may establish an uplink physical resource block (PRB) grid for the RACH procedure based at least in part on a PRB frequency location of the initial active uplink bandwidth part.

As indicated above, FIG. 1 is provided merely as an example. Other examples are possible and may differ from what was described with regard to FIG. 1.

Figure 2:
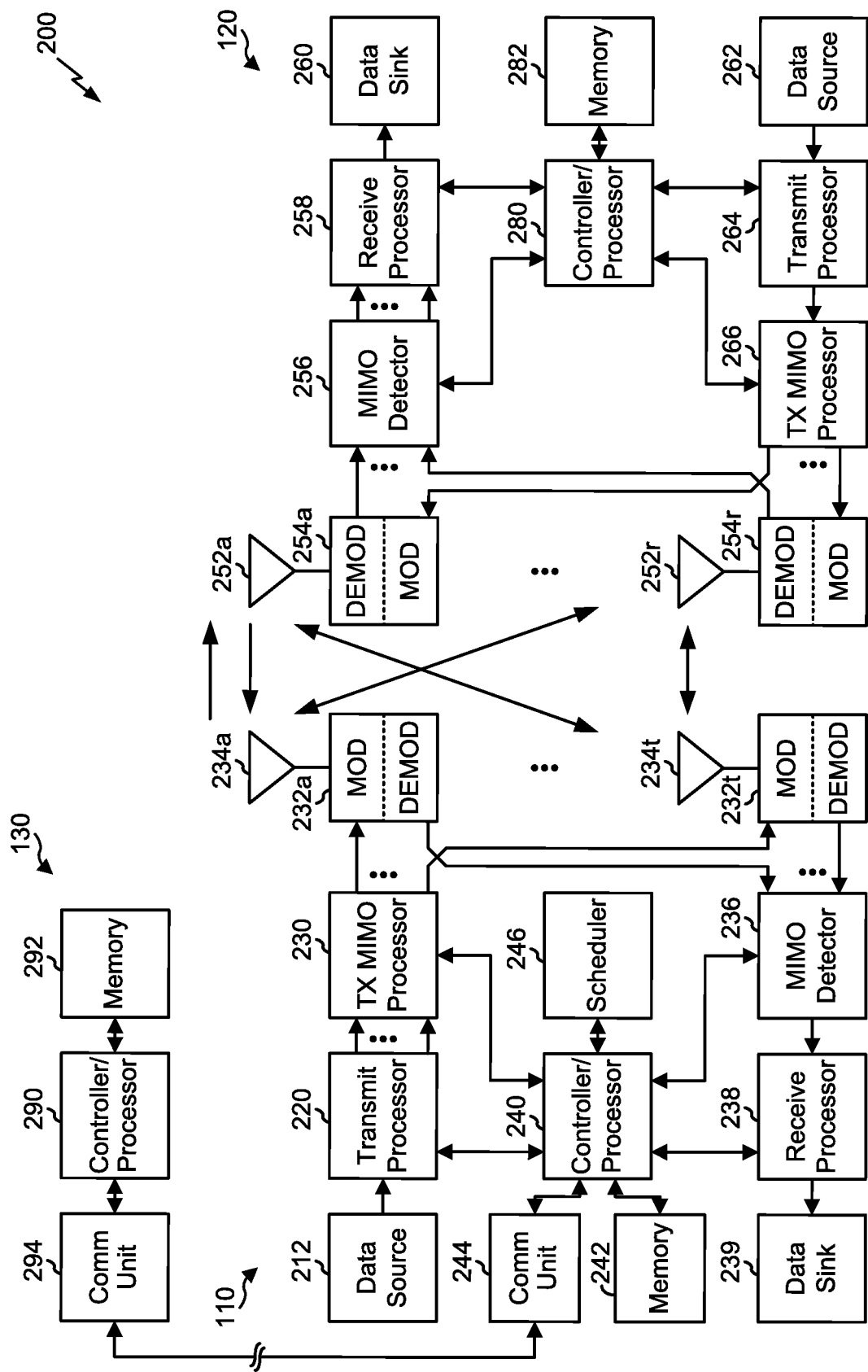
FIG. 2 shows a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with configuring an uplink bandwidth part for a random access channel (RACH) procedure, as described in more detail elsewhere herein. For example, controller/processor 240 of base station 110, controller/processor 280 of UE 120, and/or any other component(s) of FIG. 2 may perform or direct operations of, for example, process 1300 of FIG. 13, process 1400 of FIG. 14, process 1500 of FIG. 15, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for identifying a physical resource block (PRB) frequency location of an initial active uplink bandwidth part based at least in part on remaining minimum system information (RMSI) received from a base station (BS), the initial active uplink bandwidth part to be used for a random access channel (RACH) procedure between the UE and the BS, means for using an uplink PRB grid, established based at least in part on the physical resource block of the initial active uplink bandwidth part, for the RACH procedure between the UE and the BS, and/or the like. In some aspects, such means may include one or more components of UE 120 described in connection with FIG. 2.

In some aspects, base station 110 may include means for transmitting, to a user equipment (UE), a random access channel (RACH) configuration within remaining minimum system information (RMSI), the RACH configuration to be used to establish an initial active uplink bandwidth part for the UE, the initial active uplink bandwidth part to be used for a RACH procedure between the BS and the UE, means for establishing an uplink physical resource block (PRB) grid for the RACH procedure based at least in part on the initial active uplink bandwidth part, and/or the like. In some aspects, such means may include one or more components of base station 110 described in connection with FIG. 2.

In some aspects, UE 120 may include means for receiving remaining minimum system information (RMSI) from a base station (BS); means for determining an initial active uplink bandwidth part based at least in part on the RMSI; means for using the initial active uplink bandwidth part for a random access channel (RACH) procedure between the UE and the BS; and/or the like. In some aspects, such means may include one or more components of UE 120 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

As indicated above, FIG. 2 is provided merely as an example. Other examples are possible and may differ from what was described with regard to FIG. 2.

Figure 3:
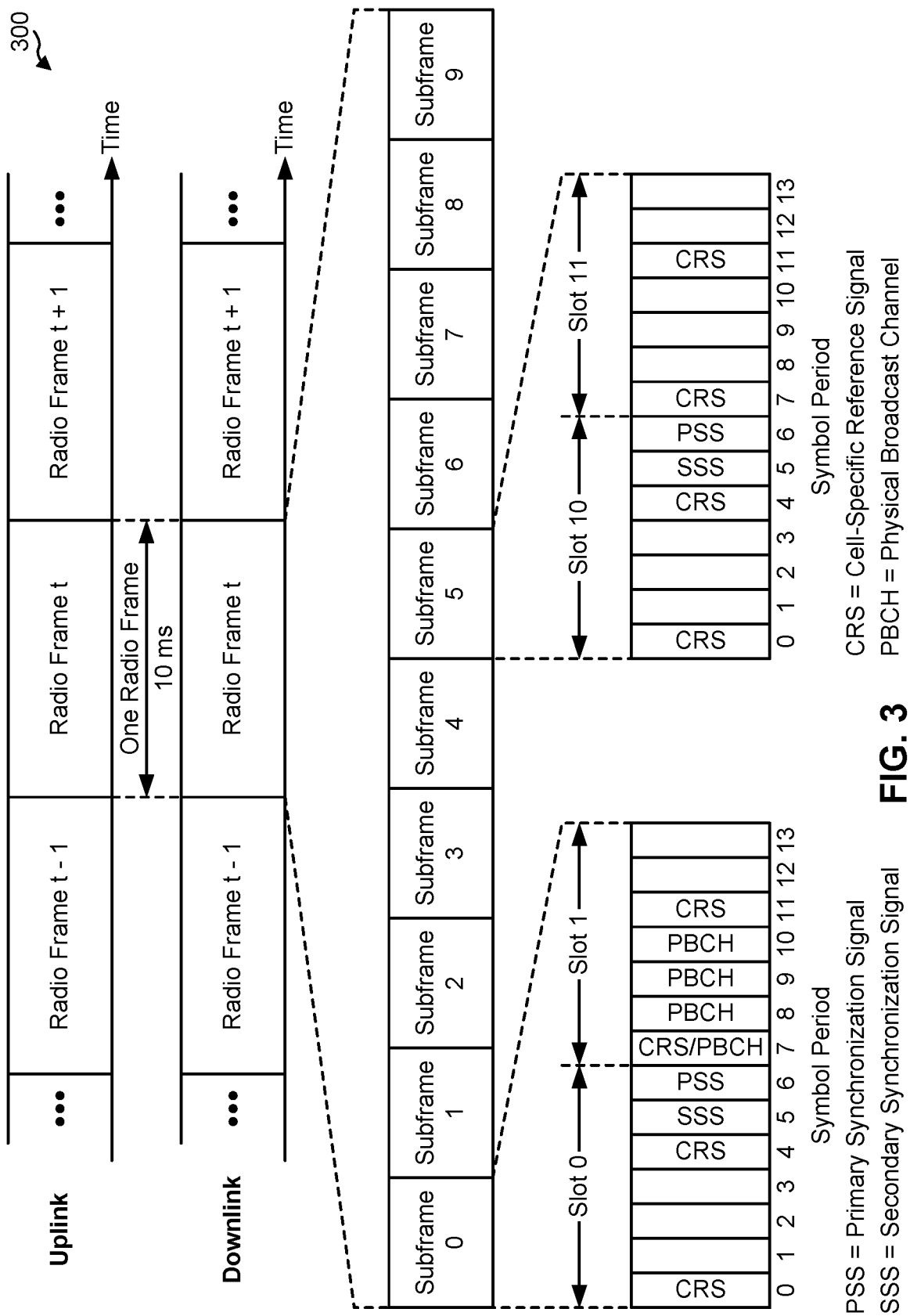
FIG. 3 is a block diagram conceptually illustrating an example of a frame structure in a wireless communication network, in accordance with various aspects of the present disclosure.

FIG. 3 shows an example frame structure 300 for frequency division duplexing (FDD) in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

According to some aspects described herein, a PRB uplink grid may be established based on a RACH procedure that uses an initial active uplink bandwidth part. As such, the PRB uplink grid may enable communication using the frame structure 300 of FIG. 3.

In other systems (e.g., such as NR or 5G systems), a Node B may transmit these or other signals (e.g., a synchronization signal block, a tracking reference signal, and/or the like) in these locations or in different locations of the subframe.

As indicated above, FIG. 3 is provided merely as an example. Other examples are possible and may differ from what was described with regard to FIG. 3.

Figure 4:
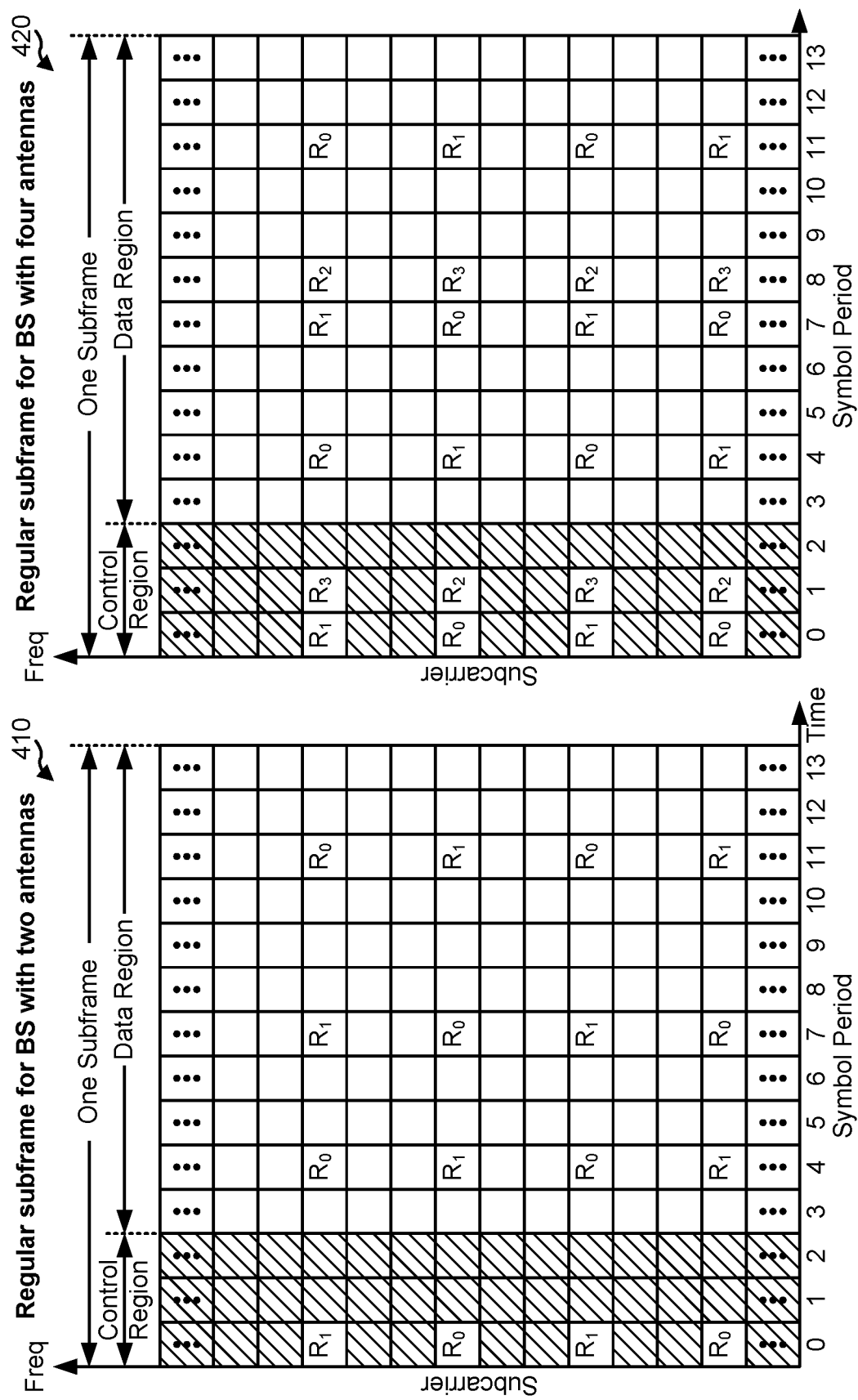
FIG. 4 is a block diagram conceptually illustrating two example subframe formats with the normal cyclic prefix, in accordance with various aspects of the present disclosure.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7, and 11. A reference signal is a signal that is known a priori by a transmitter and a receiver and may also be referred to as a pilot signal. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP Technical Specification (TS) 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include downlink/uplink (DL/UL) data as well as DL/UL control data. In some aspects, bandwidth resources may be divided into bandwidth parts, and a UE may use a single bandwidth part to communicate with a BS.

Beamforming may be supported, and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals. In some cases, DCells may transmit synchronization signals. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
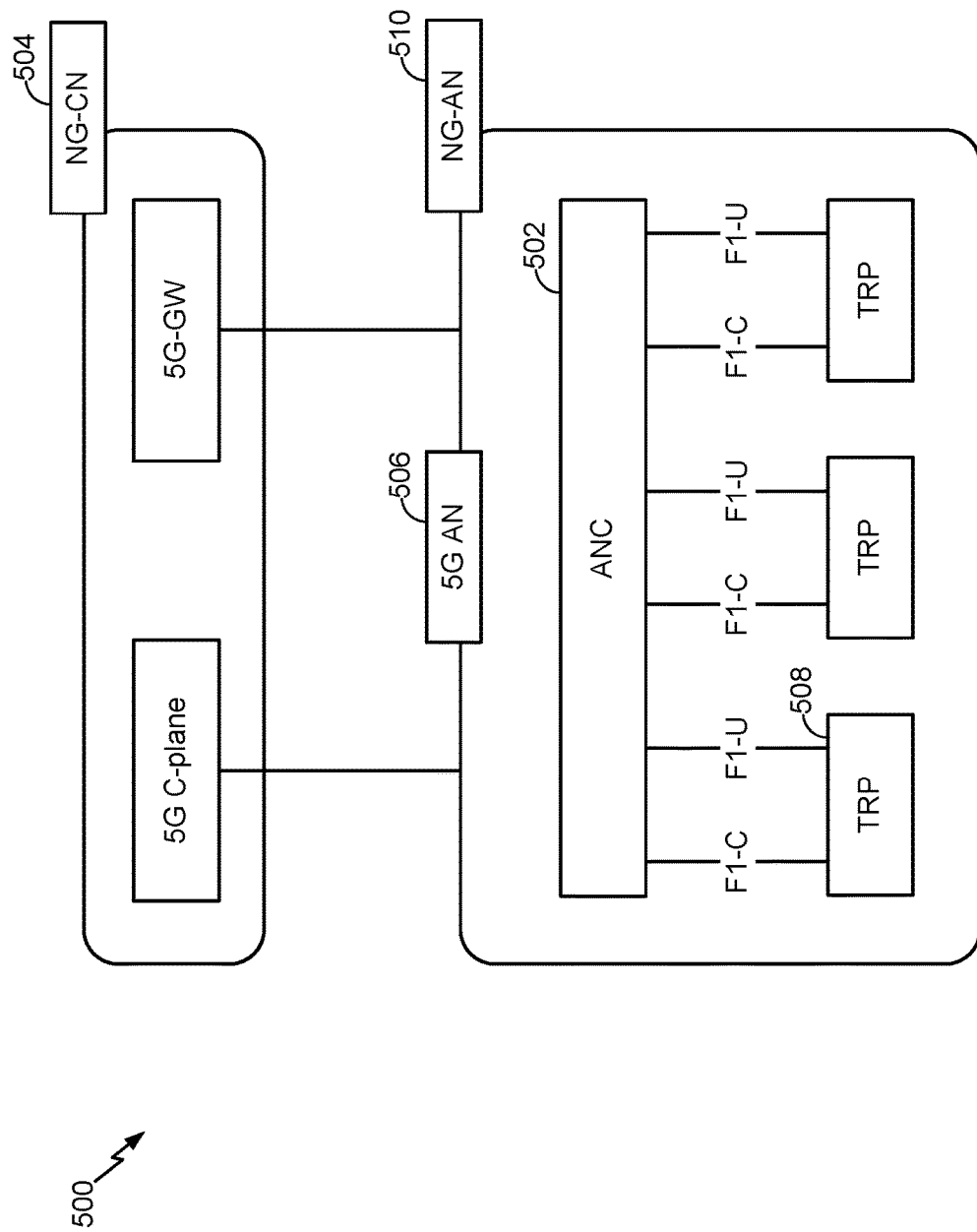
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

According to some aspects, the architecture of RAN 500 may be used to configure an initial active uplink bandwidth part for a RACH procedure. Accordingly, one or more components of FIG. 5 may provide RMSI to a UE to facilitate configuring the initial active uplink bandwidth part for the RACH procedure.

As indicated above, FIG. 5 is provided merely as an example. Other examples are possible and may differ from what was described with regard to FIG. 5.

Figure 6:
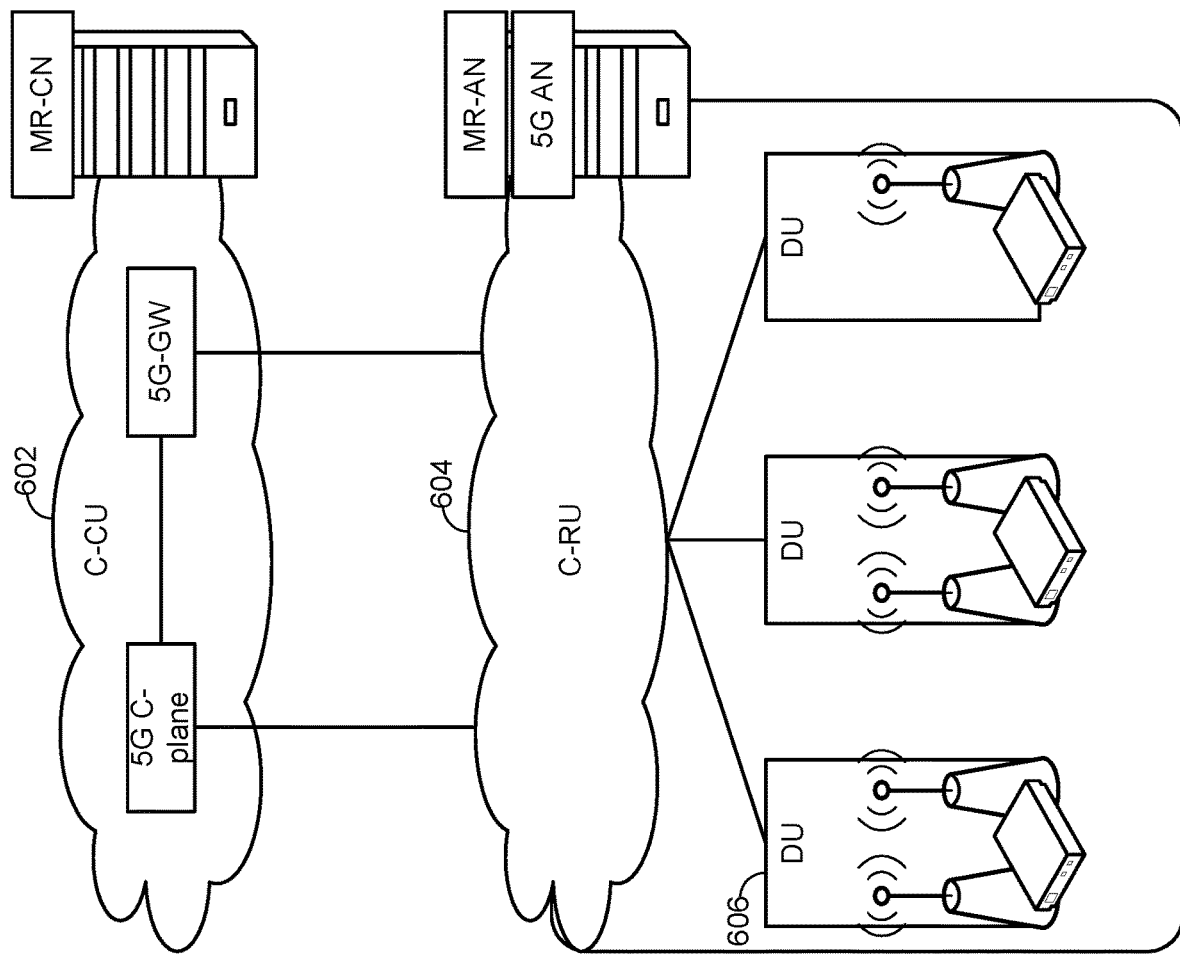
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

According to some aspects, the distributed RAN 600 may be used to configure an initial active uplink bandwidth part for a RACH procedure. Accordingly, one or more components of FIG. 6 may provide RMSI to a UE to facilitate configuring the initial active uplink bandwidth part for the RACH procedure.

As indicated above, FIG. 6 is provided merely as an example. Other examples are possible and may differ from what was described with regard to FIG. 6.

FIG. 7 is a diagram 700 showing an example of a DL-centric subframe or wireless communication structure. In some aspects, the DL-centric subframe of FIG. 7 may be used in RACH procedures. According to some aspects, information or parameters associated with the DL-centric subframe of FIG. 7 may be provided by BS 110 to UE 120 within remaining minimum system information (RMSI) during a synchronization process. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a physical DL control channel (PDCCH), as indicated in FIG. 7. In some aspects, the control portion 702 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, etc.), and/or the like.

The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric subframe may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric subframe. For example, the UL short burst portion 706 may include feedback information corresponding to the control portion 702 and/or the data portion 704. Non-limiting examples of information that may be included in the UL short burst portion 706 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 7 is provided merely as an example. Other examples are possible and may differ from what was described with regard to FIG. 7.

FIG. 8 is a diagram 800 showing an example of an UL-centric subframe or wireless communication structure. In some aspects, the UL-centric subframe of FIG. 8 may be used in RACH procedures. According to some aspects, information or parameters associated with the UL-centric subframe of FIG. 8 may be based at least in part on remaining minimum system information (RMSI) received from BS 110 during a synchronization process. The UL-centric subframe may include a control portion 802. The control portion 802 may exist in the initial or beginning portion of the UL-centric subframe. The control portion 802 in FIG. 8 may be similar to the control portion 702 described above with reference to FIG. 7. The UL-centric subframe may also include an UL long burst portion 804. The UL long burst portion 804 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 802 may be a physical DL control channel (PDCCH).

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 806. The UL short burst portion 806 in FIG. 8 may be similar to the UL short burst portion 706 described above with reference to FIG. 7 and may include any of the information described above in connection with FIG. 7. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 8 is provided merely as an example. Other examples are possible and may differ from what was described with regard to FIG. 8.

Figure 9:
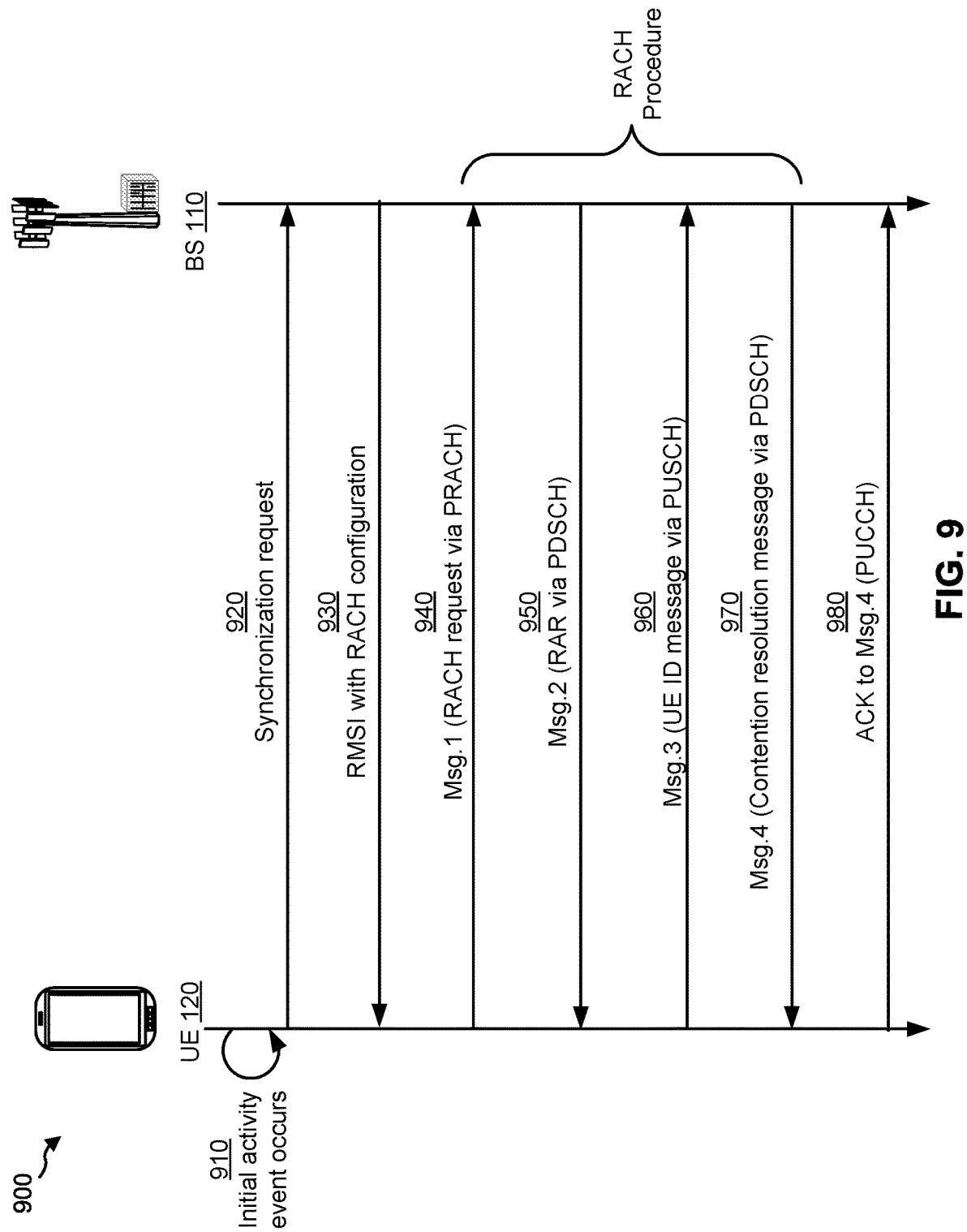
FIG. 9 is a diagram illustrating an example of a call flow for configuring an uplink bandwidth part for a random access channel (RACH) procedure, in accordance with various aspects of the present disclosure.

FIG. 9 is a diagram illustrating an example 900 of a call flow for a random access channel (RACH) procedure, in accordance with various aspects of the present disclosure. As shown in FIG. 9, BS 110 and UE 120 exchange communications, including communications of a RACH procedure, based at least in part on an initial activity event occurring with UE 120. An initial activity may include UE 120 powering on, UE 120 entering a coverage area of BS 110, and/or the like. According to some aspects described herein, UE 120 and BS 110 may utilize an initial active uplink bandwidth part to perform the RACH procedure of FIG. 9. From the RACH procedure, according to some aspects herein, an uplink physical resource block (PRB) grid may be established for communication between UE 120 and BS 110. As such, the initial active uplink bandwidth part may enable UE 120 to save power resources (rather than transmitting across a wider bandwidth), ensure that UE 120 has the bandwidth capability to communicate with BS 110 (as some types of UE 120 may not have broad bandwidth capabilities), and enable BS 110 to balance the load of the bandwidth parts of the bandwidth used for communication with UE 120 (e.g., by evenly distributing communications with UEs across uplink bandwidth parts of an uplink bandwidth).

As shown in FIG. 9, and by reference 910, an initial activity event occurs with UE 120. For example, UE 120 may be powered on and/or may enter a coverage area of BS 110. Based at least in part on the initial activity event occurring, UE 120, as shown by reference number 920, sends a synchronization request to BS 110. As shown by reference number 930, BS 110 replies to the synchronization request by sending RMSI with a RACH configuration to UE 120. For example, the RMSI may include communication information for UE 120 to use to communicate with BS 110. The RMSI may be SystemInformationBlockType1 (SIB-1) and/or may be included within SIB-1. Accordingly, SIB-1 may be used to indicate the RMSI and/or the RACH configuration. The RACH configuration, according to some aspects described herein, may include information associated with an initial active uplink bandwidth part for the RACH procedure of FIG. 9 to enable UE 120 and BS 110 to establish a communication link. For example, the RACH configuration may indicate or provide instructions for identifying the initial active uplink bandwidth part (e.g., via a PRB frequency location of the initial active uplink bandwidth part, a bandwidth of the initial active uplink bandwidth part, and/or a numerology of the initial active uplink bandwidth part). Using the PRB frequency location, the bandwidth, and/or the numerology of the initial active uplink bandwidth part, an uplink PRB grid may be established for communication between UE 120 and BS 110.

As shown in FIG. 9, a RACH procedure is performed (as illustrated by reference numbers 940-970) using an initial active uplink bandwidth part. In the RACH procedure of FIG. 9, and as shown by reference number 940, using information from the RMSI, UE 120 sends Msg.1 with a RACH request via a physical random access channel (PRACH). As shown by reference number 950, BS 110 may reply to Msg.1 with Msg.2 (random access response (RAR)) via the PDSCH. As shown by reference number 960, UE 120 sends Msg.3 (a UE identification message) via the PUSCH. As shown by reference number 970, BS 110 sends Msg.4 (contention resolution message) via the PDSCH. After the RACH procedure, as shown by reference number 980, UE 120 may send an acknowledgement indicating that UE 120 is ready to communicate with BS 110 via an uplink PRB grid (which is used in the communication link between UE 120 and BS 110).

As mentioned above, and is further described below, at least with reference to FIGS. 10-12, the RMSI (e.g., within SIB-1 and/or within the RACH configuration) includes information corresponding to a PRB frequency location of the initial active uplink bandwidth part to be used in the RACH procedure of FIG. 9. Additionally, or alternatively, the RMSI may indicate a bandwidth for the initial active uplink bandwidth part. For example, the information in the RACH configuration of the RMSI may indicate that the bandwidth is to be a same bandwidth as a minimum uplink transmission bandwidth of the RACH procedure, a bandwidth of the PUSCH for Msg.3, a bandwidth of the PUCCH for the acknowledgement to Msg.4, and/or the like. In some aspects (e.g., for time division duplexing implementations), UE 120 may determine that the bandwidth is to be the same as an initial active downlink bandwidth part for UE 120. Accordingly, UE 120 may identify the bandwidth information in the RMSI to identify and/or determine a bandwidth for the initial active uplink bandwidth part.

Furthermore, in some aspects, the RMSI (e.g., with the RACH configuration) may include a numerology of the initial active uplink bandwidth part. For example, the numerology may include or indicate a subcarrier spacing for the RACH procedure, a cyclic prefix for the RACH procedure, or a number of symbols per slot for the RACH procedure. Additionally, or alternatively, the numerology may be indicated to be the same as a numerology for Msg.3 and/or the acknowledgement to Msg.4 from UE 120.

After the acknowledgement, UE 120 and/or BS 110 may establish and/or utilize an uplink PRB grid for communications. For example, UE 120 and/or BS 110 may establish the uplink PRB grid based at least in part on the PRB frequency location of the initial active uplink bandwidth part, the bandwidth of the initial active uplink bandwidth part, and/or the numerology of the initial active uplink bandwidth part. According to some implementations, the uplink PRB grid for the RACH procedure may be used for one or more of the PRACH, the PUSCH, or the PUCCH mentioned in FIG. 9.

According to some aspects described herein, the RMSI, sent from BS 110 to UE 120, includes information corresponding to PRACH, the PUSCH, and/or the PUCCH to identify parameters (e.g., an uplink PRB frequency location, a bandwidth, a numerology, and/or the like) of the initial active uplink bandwidth part used for the RACH procedure of FIG. 9. As such, based at least in part on the RMSI, UE 120 may determine and/or identify the parameters of the initial active uplink bandwidth part to exchange communications, of the RACH procedure, with BS 110.

As indicated above, FIG. 9 is provided as an example. Other examples are possible and may differ from what was described with respect to FIG. 9.

Figure 10:
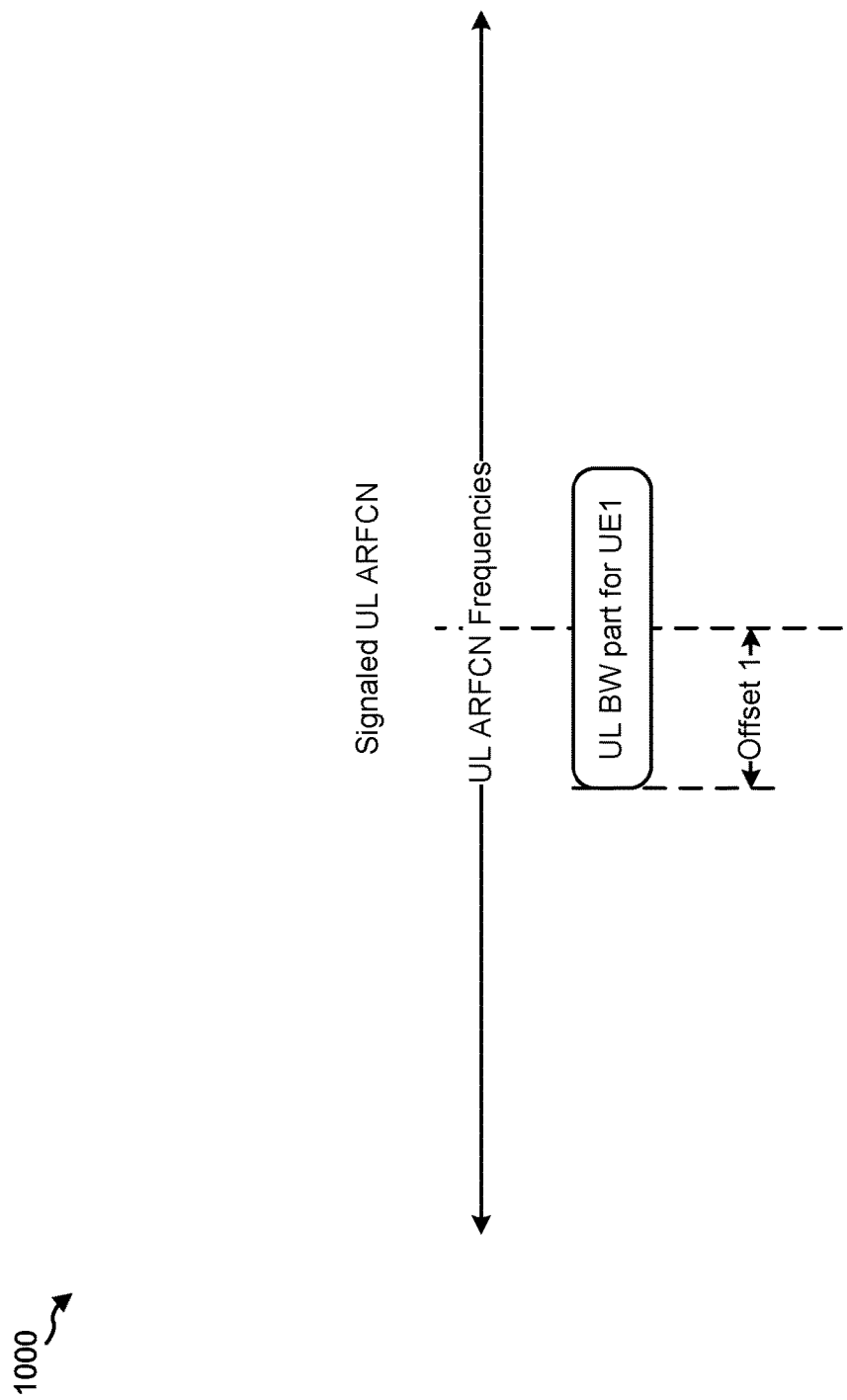
FIG. 10 is a diagram illustrating an example of configuring an uplink bandwidth part for a random access channel (RACH) procedure, in accordance with various aspects of the present disclosure.

FIG. 10 is a diagram illustrating an example 1000 of configuring an uplink bandwidth part for a random access channel (RACH) procedure, in accordance with various aspects of the present disclosure. The example of FIG. 10 illustrates an example of information that may be used to determine a PRB frequency location for an initial active uplink bandwidth part (shown as UL BW part for UE1) for a UE (i.e., UE1). In the example of FIG. 10, a single initial active uplink bandwidth part may be used for all UEs (e.g., a plurality of UEs 120) in communication with a BS (e.g., BS 110) following an initial activity event.

As shown in FIG. 10, a reference uplink frequency, such as an absolute radio frequency channel number (ARFCN)) (signaled UL ARFCN) and an offset (offset 1) are signaled (e.g., within a RACH configuration of the RMSI). The ARFCN may be an evolved ARFCN (EARFCN), such as an evolved-UTRA ARFCN. In some aspects, the offset can be standard or fixed for UE1 (e.g., based at least in part on a 3GPP standard). Accordingly, the PRB frequency location for the initial active uplink bandwidth part can be identified from offset 1 and the signaled UL ARFCN. In other words, in FIG. 10, the PRB frequency location of the initial active uplink bandwidth part is at a frequency location that is offset, by an amount corresponding to offset 1, from the signaled UL ARFCN.

In this way, an initial active uplink bandwidth part may be used by a UE for a RACH procedure with a BS.

As indicated above, FIG. 10 is provided as an example. Other examples are possible and may differ from what was described with respect to FIG. 10.

Figure 11:
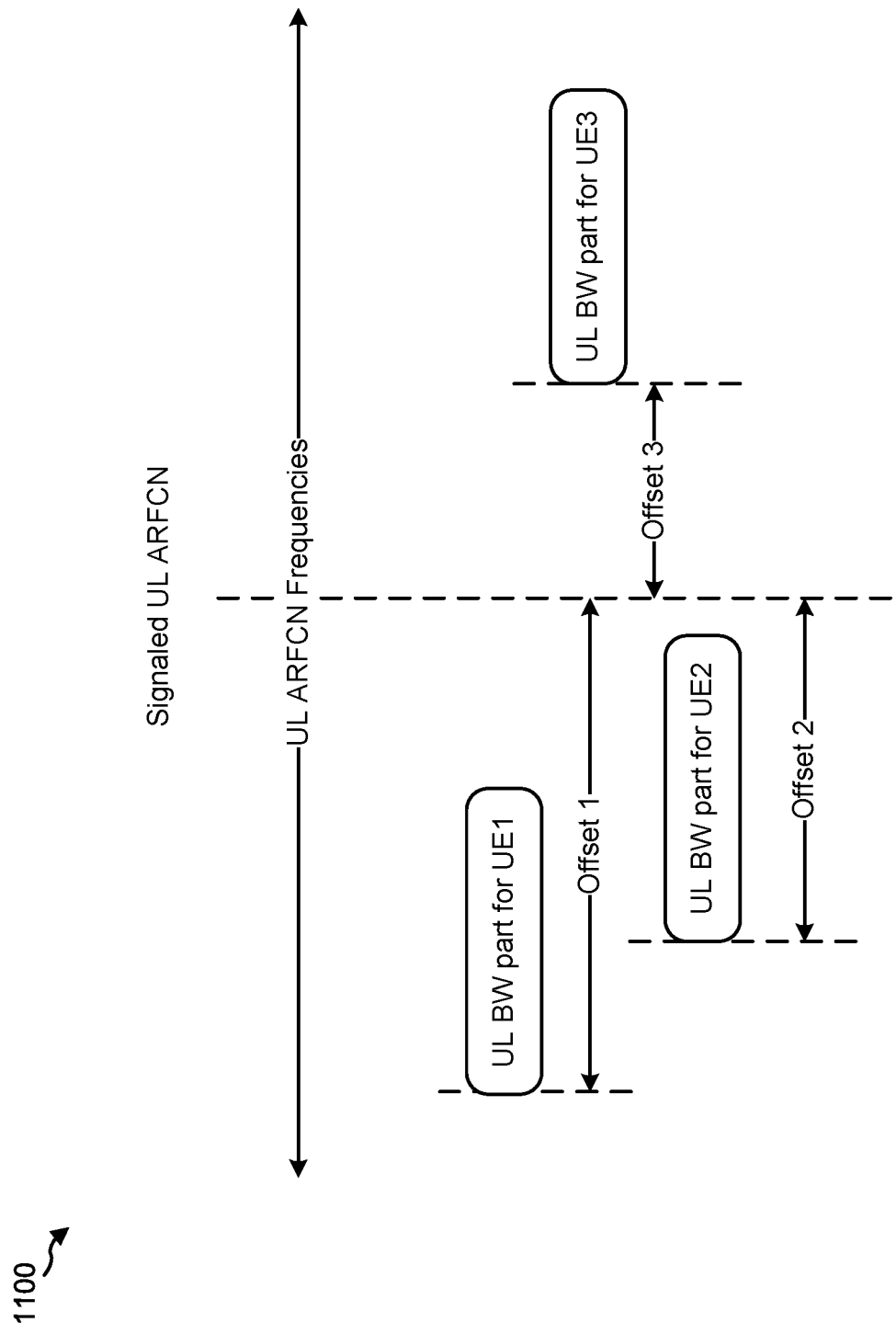
FIG. 11 is a diagram illustrating an example of configuring an uplink bandwidth part for a random access channel (RACH) procedure, in accordance with various aspects of the present disclosure.

FIG. 11 is a diagram illustrating an example 1100 of configuring an uplink bandwidth part for a random access channel (RACH) procedure, in accordance with various aspects of the present disclosure. The example of FIG. 11 illustrates an example of information that may be used to determine one or more PRB frequency locations for one or more initial active uplink bandwidth parts (shown as UL BW part for UE1, UL BW part for UE2, and UL BW part for UE3) for a plurality of UEs (shown as UE1, UE2, and UE3). In the example of FIG. 11, a plurality of initial active uplink bandwidth parts may be active or available for communication with a BS (e.g., BS 110) and a single reference uplink frequency location may be used to identify the initial active uplink bandwidth parts to be used for the RACH procedure.

For example, in FIG. 11, different offsets may be provided to UE1, UE2, and UE3 such that UE1, UE2, and UE3 may determine the PRB frequency location for UL BW part for UE1, UL BW part for UE2, and UL BW part for UE3, respectively. More specifically, a BS may indicate offset 1 in RMSI sent to UE1, offset 2 in RMSI sent to UE2, and offset 3 in RMSI sent to UE3. Accordingly, based at least in part on the offsets and the signaled UL ARFCN from the BS, the UEs (UE1, UE2, and UE3) may determine the PRB frequency locations for the initial active uplink bandwidth parts for the RACH procedure.

In some aspects, the UEs of FIG. 11 may select one of the offsets 1-3 from the signaled reference uplink frequency location as the PRB frequency location for the initial active uplink bandwidth part. For example, the UEs may randomly select one of the offsets 1-3 and/or may select one of the offsets based at least in part on a predefined rule or setting. For example, the predefined rule or setting may use a mapping/hash function generated from a parameter (e.g., an ID associated with a UE), a synchronization signal block (SSB) index of the PRACH of the RACH procedure, or a slot index of the PRACH transmission of the RACH procedure.

In this way, a UE may select from and/or use one or more of a plurality of initial active uplink bandwidth parts for a RACH procedure with a BS based at least in part on an indication (e.g., within the RMSI) of a reference uplink frequency location and one or more offsets.

As indicated above, FIG. 11 is provided as an example. Other examples are possible and may differ from what was described with respect to FIG. 11.

Figure 12:
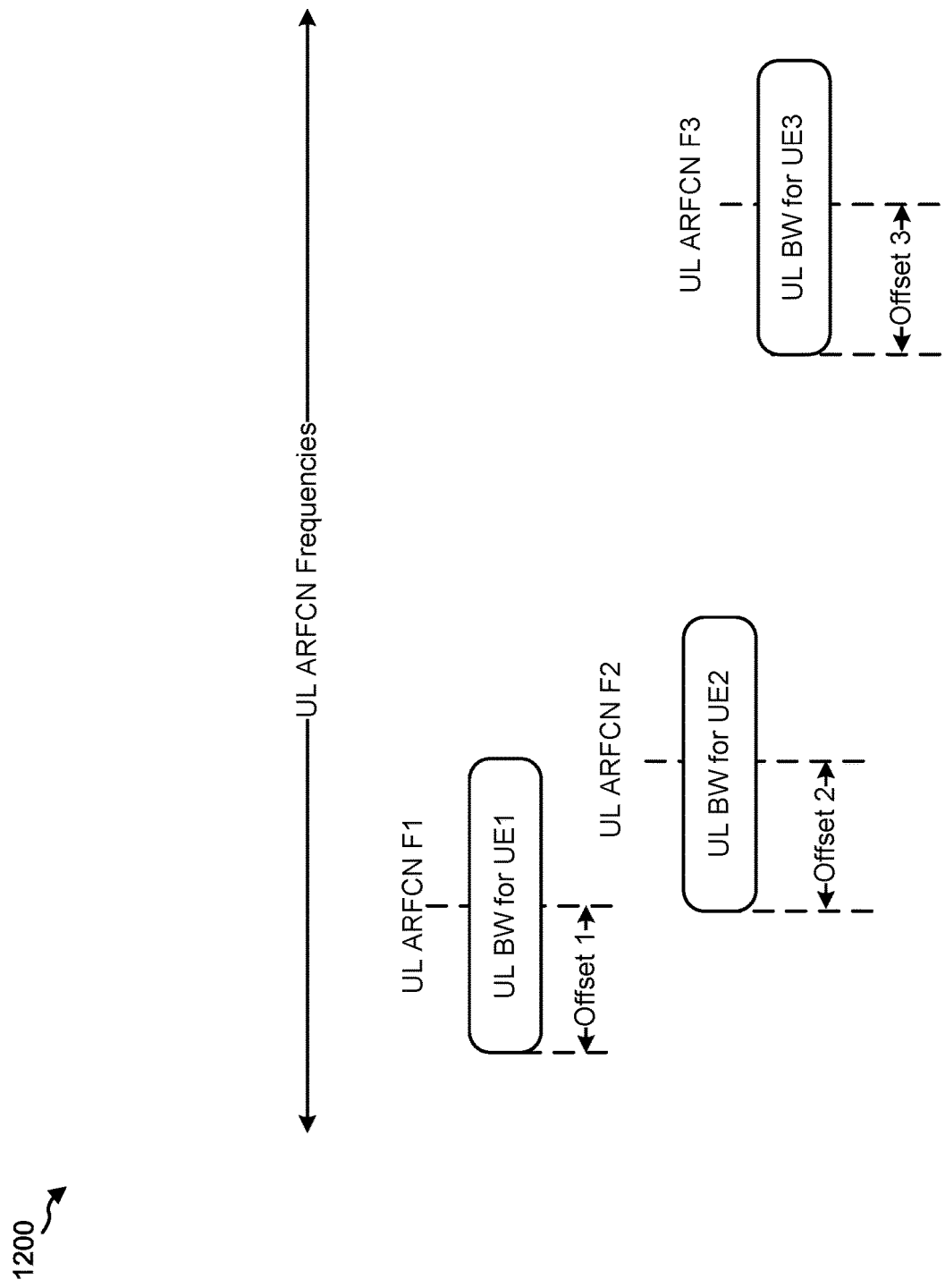
FIG. 12 is a diagram illustrating an example of configuring an uplink bandwidth part for a random access channel (RACH) procedure, in accordance with various aspects of the present disclosure.

FIG. 12 is a diagram illustrating an example 1200 of configuring an uplink bandwidth part for a random access channel (RACH) procedure, in accordance with various aspects of the present disclosure. The example of FIG. 12 illustrates an example of information that may be used to determine one or more PRB frequency locations for one or more initial active uplink bandwidth parts (shown as UL BW part for UE1, UL BW part for UE2, and UL BW part for UE3) for a plurality of UEs (shown as UE1, UE2, and UE3). In the example of FIG. 12, a plurality of initial active uplink bandwidth parts may be active or available for communication with a BS (e.g., BS 110) and a plurality of reference uplink frequency locations (shown as UL ARFCN F1, UL ARFCN F2, and UL ARFCN F3) may be provided with corresponding offsets (shown as offset 1, offset 2, and offset 3)

In some aspects, the UEs of FIG. 12 may select one of UL ARFCN F1, UL ARFCN F2, or UL ARFCN F3 for the PRB frequency location of the initial active uplink bandwidth part. In some aspects, the UEs may randomly select one of the offsets 1-3 and/or may select one of the offsets based at least in part on a predefined rule or setting. Similar to the above, the predefined rule or setting may use a mapping/hash function generated from a parameter (e.g., an ID associated with a UE), a synchronization signal block (SSB) index of the PRACH of the RACH procedure, or a slot index of the PRACH transmission of the RACH procedure.

In this way, a UE may select from and/or use one or more of a plurality of initial active uplink bandwidth parts for a RACH procedure with a BS based at least in part on an indication (e.g., within the RMSI) of a plurality of reference uplink frequency locations and corresponding offsets.

As indicated above, FIG. 12 is provided as an example. Other examples are possible and may differ from what was described with respect to FIG. 12.

Figure 13:
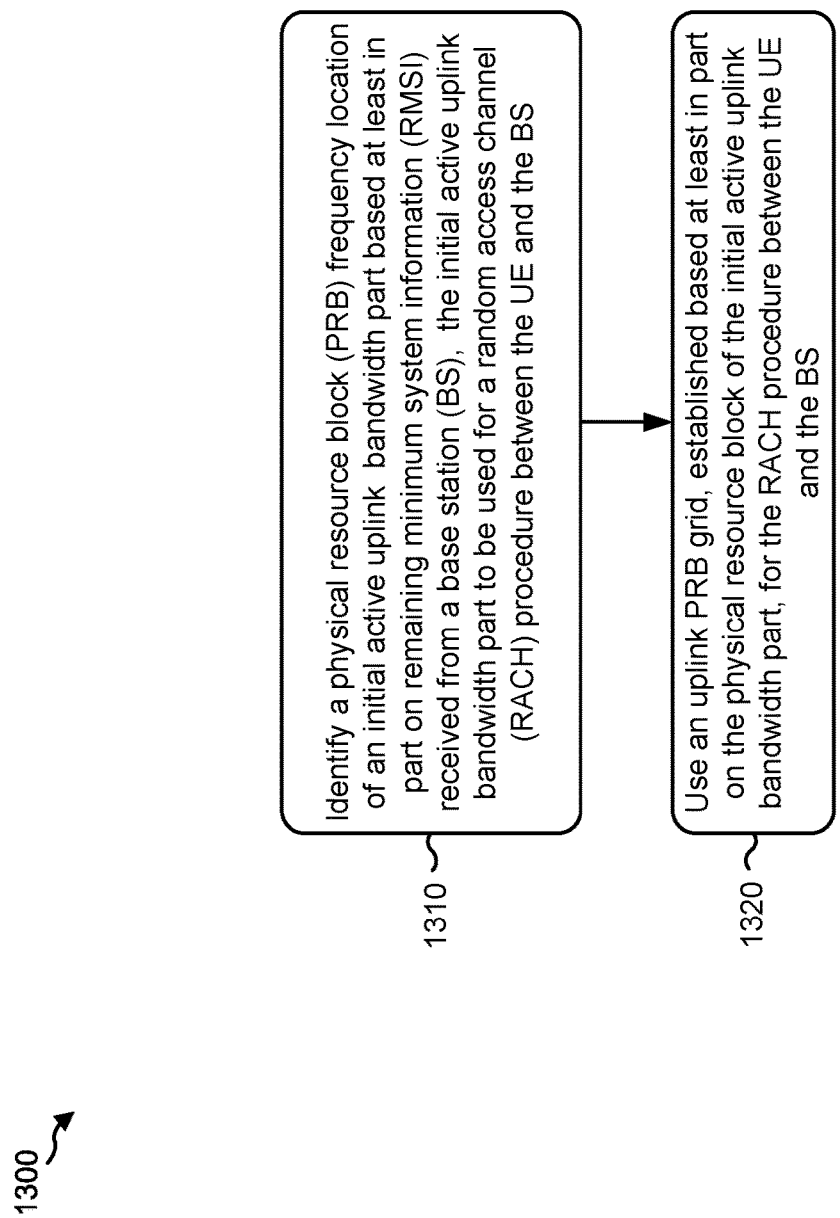
FIG. 13 is a diagram illustrating an example process performed, for example, by a user equipment, in accordance with various aspects of the present disclosure.

FIG. 13 is a diagram illustrating an example process 1300 performed, for example, by a UE, in accordance with various aspects of the present disclosure. Example process 1300 is an example where a UE (e.g., UE 120) configures an initial active uplink bandwidth part for a RACH procedure.

As shown in FIG. 13, in some aspects, process 1300 may include identifying a physical resource block (PRB) frequency location of an initial active uplink bandwidth part based at least in part on remaining minimum system information (RMSI) received from a base station (BS), the initial active uplink bandwidth part to be used for a random access channel (RACH) procedure between the UE and the BS (block 1310). For example, the UE (e.g., using transmit processor 264, controller/processor 280, and/or the like) may identify a PRB frequency location of an initial active uplink bandwidth part based at least in part on RMSI received from a BS, as described above.

In some aspects, identifying the PRB frequency location of the initial active uplink bandwidth part may include identifying a reference uplink frequency location of an uplink transmission of the UE; identifying an offset from the reference uplink frequency location; and identifying the PRB frequency location of the initial active uplink bandwidth part to be at a frequency location at the offset from the reference uplink frequency location. In some aspects, the reference frequency location may be an absolute radio frequency channel number indicated in the RMSI or a physical random access channel (PRACH) frequency location indicated in the RMSI.

In some aspects, identifying the PRB frequency location of the initial active uplink bandwidth part may include identifying a plurality of offsets in a RACH configuration, of the RACH procedure, included within the RMSI, wherein the plurality of offsets are associated with different initial active uplink bandwidth parts; and selecting the offset, from the plurality of offsets, for the PRB frequency location of the initial active uplink bandwidth part. In some aspects, selecting the offset from the plurality of offsets may include selecting the offset based at least in part on a setting of the UE associated with the RACH procedure.

In some aspects, identifying the PRB frequency location of the initial active uplink bandwidth part may include identifying a plurality of reference uplink frequency locations in a RACH configuration, of the RACH procedure, included within the RMSI; and selecting a reference uplink frequency location from the plurality of reference uplink frequency locations to identify the PRB location of the initial active uplink bandwidth part. In some aspects, selecting the reference uplink frequency location from the plurality of reference uplink frequency locations may include selecting the reference uplink frequency location based at least in part on a setting of the UE associated with the RACH procedure. In some aspects, the setting may include at least one of a mapping or hash function based at least in part on a parameter of the UE, a synchronization signal block (SSB) index of a physical random access channel (PRACH) transmission of the RACH procedure, or a slot index of the PRACH transmission of the RACH procedure.

As further shown in FIG. 13, in some aspects, process 1300 may include using an uplink PRB grid, established based at least in part on the physical resource block of the initial active uplink bandwidth part, for the RACH procedure between the UE and the BS (block 1320). For example, the UE (e.g., using antenna 252, MOD 254, transmit processor 264, TX MIMO processor 266, controller/processor 280, and/or the like) may use an uplink PRB grid established based at least in part on the physical resource block of the initial active uplink bandwidth part, for the RACH procedure between the UE and the BS, as described above.

In some aspects, the uplink PRB grid may be based at least in part on a bandwidth of the initial active uplink bandwidth part, wherein information identifying the bandwidth of the initial active uplink bandwidth part may be included in the RMSI. In some aspects, the bandwidth of the initial active uplink bandwidth part may be based at least in part on a bandwidth of an initial active downlink bandwidth part for the UE, a minimum uplink transmission bandwidth of the RACH procedure, a bandwidth of a physical uplink shared channel (PUSCH) for a Message 3 (Msg.3) transmission of the RACH procedure, or a bandwidth of a physical uplink control channel (PUCCH) for an acknowledgement (ACK) to a Message 4 (Msg.4) transmission of the RACH procedure. In some aspects, the PUSCH or the bandwidth of the PUCCH is signaled within the RMSI.

In some aspects, the uplink PRB grid may be based at least in part on a numerology of the initial active uplink bandwidth part, wherein the numerology comprises at least one of a subcarrier spacing for the RACH procedure, a cyclic prefix for the RACH procedure, or a number of symbols per slot for the RACH procedure. In some aspects, the numerology may be based at least in part on at least one of a numerology of a physical uplink shared channel (PUSCH) for a Message 3 (Msg.3) transmission of the RACH procedure, or a numerology of a physical uplink control channel (PUCCH) for an acknowledgment (ACK) of a Message 4 (Msg.4) transmission of the RACH procedure.

In some aspects, the uplink PRB grid may be established based at least in part on the PRB frequency location of the initial active uplink bandwidth part and at least one of a bandwidth of the initial active uplink bandwidth part, or a numerology of the initial active uplink bandwidth part.

In some aspects, the uplink PRB grid for the RACH procedure is used for at least one of a physical random access channel (PRACH) of the RACH procedure, a physical uplink control channel (PUCCH) of the RACH procedure, or a physical uplink shared channel (PUSCH) of the RACH procedure.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
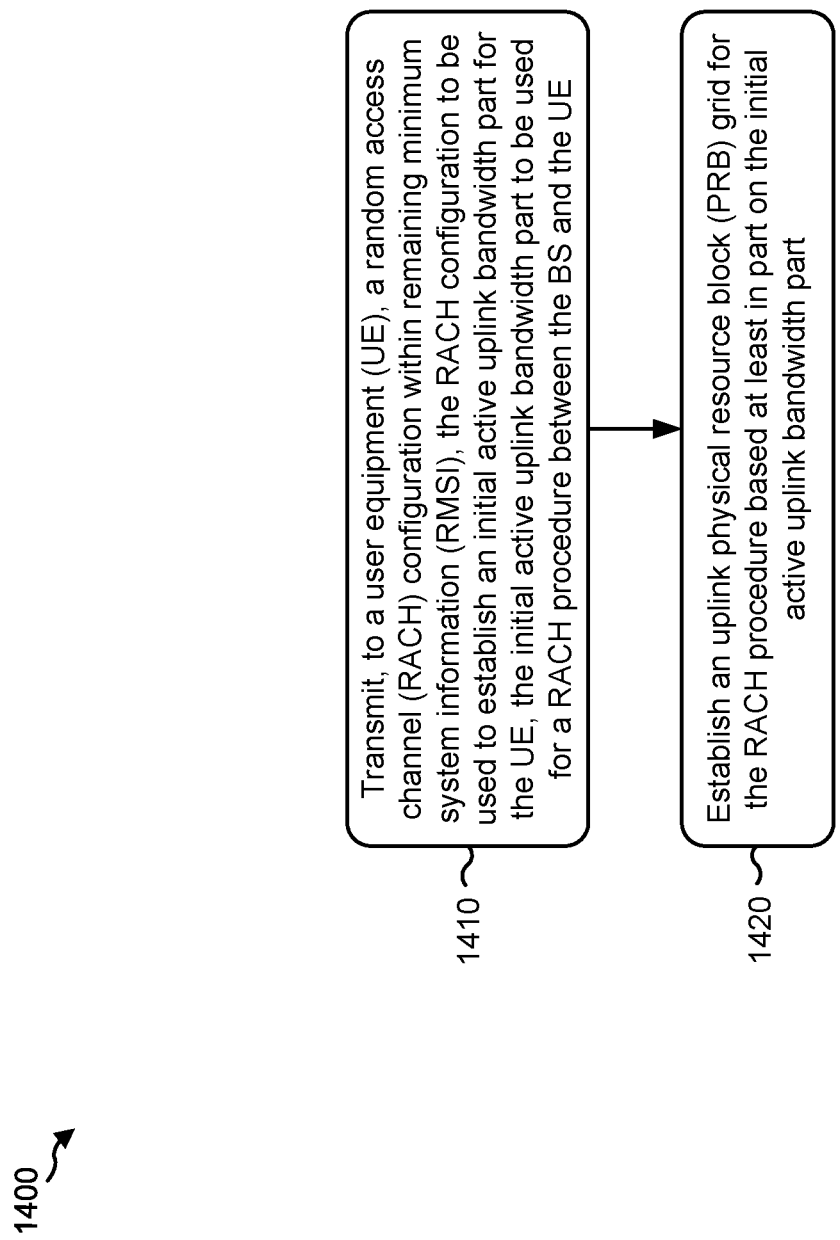
FIG. 14 is a diagram illustrating an example process performed, for example, by a base station, in accordance with various aspects of the present disclosure.

FIG. 14 is a diagram illustrating an example process 1400 performed, for example, by a BS, in accordance with various aspects of the present disclosure. Example process 1400 is an example where a BS (e.g., BS 110) configures an initial active uplink bandwidth part for a RACH procedure.

As shown in FIG. 14, in some aspects, process 1400 may include transmitting, to a user equipment (UE), a random access channel (RACH) configuration within remaining minimum system information (RMSI), the RACH configuration to be used to establish an initial active uplink bandwidth part for the UE, the initial active uplink bandwidth part to be used for a RACH procedure between the BS and the UE (block 1410). For example, the BS (e.g., using transmit processor 220, TX MIMO processor 230, MOD 232, antenna 234, controller/processor 240, and/or the like) may transmit a RACH configuration within RMSI to a UE, as described above.

In some aspects, the RACH configuration may include a reference uplink frequency location of an uplink transmission of the UE, and an offset from the reference uplink frequency location, wherein the PRB frequency location of the initial active uplink bandwidth part is located at a frequency location that is at the offset from the reference uplink frequency location. In some aspects, the reference uplink frequency location may include an absolute radio frequency channel number (ARFCN) indicated in the RMSI; or a physical random access channel (PRACH) frequency location indicated in the RMSI.

In some aspects, the RACH configuration may include a plurality of offsets, wherein the plurality of offsets are associated with different initial active uplink bandwidth parts, and wherein the offset is to be selected from the plurality of offsets, such that the PRB frequency location of the initial active uplink bandwidth part is at a frequency location of the offset. In some aspects, the RACH configuration may indicate that the offset is to be selected from the plurality of offsets based at least in part on a setting of the UE. In some aspects, the RACH configuration may include a plurality of reference uplink frequency locations, wherein a reference uplink frequency location is to be selected from the plurality of reference uplink frequency locations as a center frequency for the initial active uplink bandwidth part. In some aspects, the RACH configuration may indicate that the reference uplink frequency location is to be selected from the plurality of reference uplink frequency locations based at least in part on a setting of the UE. In some aspects, the setting may include at least one of a mapping or hash function based at least in part on a parameter of the UE, a synchronization signal block (SSB) index of a physical random access channel (PRACH) transmission of the RACH procedure, or a slot index of the PRACH transmission of the RACH procedure.

As shown in FIG. 14, in some aspects, process 1400 may include establishing an uplink physical resource block (PRB) grid for the RACH procedure based at least in part on the initial active uplink bandwidth part (block 1420). For example, the BS (e.g., using transmit processor 220, TX MIMO processor 230, MOD 232, antenna 234, controller/processor 240, and/or the like) may establish an uplink PRB grid for the RACH procedure based at least in part on the initial active uplink bandwidth part, as described above.

In some aspects, the uplink PRB grid may be established based at least in part on a bandwidth of the initial active uplink bandwidth part, wherein information identifying the bandwidth of the initial active uplink bandwidth part is included in the RMSI.

In some aspects, the uplink PRB grid may be established based at least in part on a bandwidth of the initial active uplink bandwidth part. For example, the bandwidth of the initial active uplink bandwidth part may be based at least in part on a bandwidth of an initial active downlink bandwidth part for the UE, a minimum uplink transmission bandwidth of the RACH procedure, a bandwidth of a physical uplink shared channel (PUSCH) for a Message 3 (Msg.3) transmission of the RACH procedure, or a bandwidth of a physical uplink control channel (PUCCH) for an acknowledgement (ACK) Message 4 (Msg.4) transmission of the RACH procedure. In some aspects, the bandwidth of the PUSCH or the PUCCH is signaled within the RMSI.

In some aspects, the uplink PRB grid may be established based at least in part on a numerology of the initial active uplink bandwidth part, wherein the numerology indicates at least one of a subcarrier spacing for the RACH procedure, a cyclic prefix for the RACH procedure, or a number of symbols per slot for the RACH procedure. In some aspects, the numerology may include a numerology of a physical uplink shared channel (PUSCH) for a Message 3 (Msg.3) transmission of the RACH procedure, or a numerology of a physical uplink control channel (PUCCH) for an acknowledgment (ACK) of a Message 4 (Msg.4) transmission of the RACH procedure.

In some aspects, the uplink PRB grid may be established based at least in part on a PRB frequency location of the initial active uplink bandwidth part and at least one of a bandwidth of the initial active uplink bandwidth part, or a numerology of the initial active uplink bandwidth part.

In some aspects, the uplink PRB grid for the RACH procedure is used for at least one of: a physical random access channel (PRACH) of the RACH procedure, a physical uplink control channel (PUCCH) of the RACH procedure, or a physical uplink shared channel (PUSCH) of the RACH procedure.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
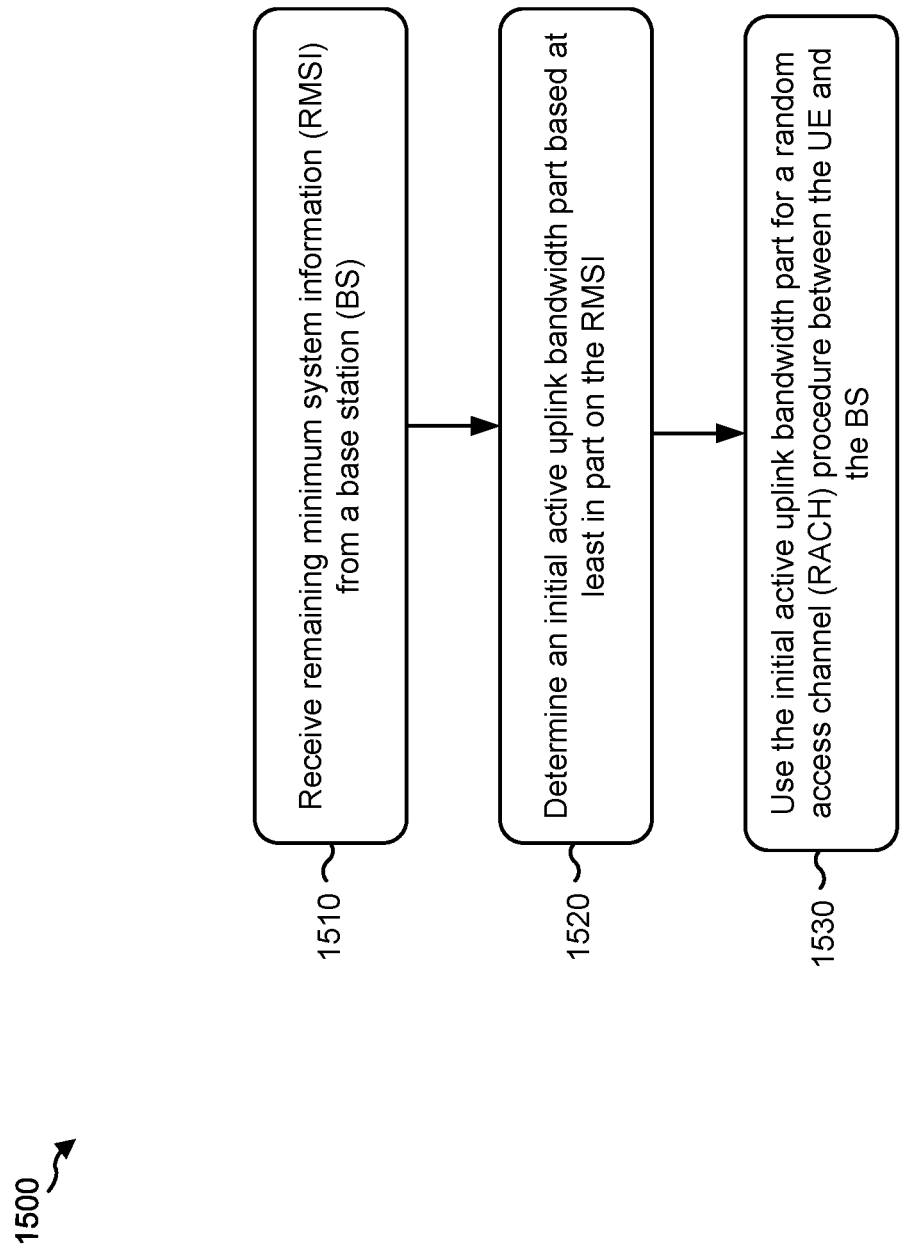
FIG. 15 is a diagram illustrating an example process performed, for example, by a user equipment, in accordance with various aspects of the present disclosure.

FIG. 15 is a diagram illustrating an example process 1500 performed, for example, by a UE, in accordance with various aspects of the present disclosure. Example process 1500 is an example where a UE (e.g., UE 120) configures an initial active uplink bandwidth part for a RACH procedure.

As shown in FIG. 15, in some aspects, process 1500 may include receiving remaining minimum system information (RMSI) from a base station (BS) (block 1510). For example, the UE (e.g., using antenna 252, DEMOD 254, MIMO detector 256, receive processor 258, controller/processor 280, and/or the like) may receive the RMSI from the base station (BS), as described above.

In some aspects, the RMSI includes a numerology of the initial active uplink bandwidth part, wherein the numerology comprises at least one of: a subcarrier spacing for the RACH procedure, a cyclic prefix for the RACH procedure, or a number of symbols per slot for the RACH procedure. In some aspects, the numerology is based at least in part on at least one of: a numerology of a physical uplink shared channel (PUSCH) for a Message 3 (Msg.3) transmission of the RACH procedure, or a numerology of a physical uplink control channel (PUCCH) for an acknowledgment (ACK) of a Message 4 (Msg.4) transmission of the RACH procedure.

In some aspects, the RMSI includes at least one of: a bandwidth of the initial active uplink bandwidth part, a reference frequency of the initial active uplink bandwidth part, an offset from the reference frequency of the initial active uplink bandwidth part, or a numerology of the initial active uplink bandwidth part.

As further shown in FIG. 15, in some aspects, process 1500 may include determining an initial active uplink bandwidth part based at least in part on the RMSI (block 1520). For example, the UE (e.g., using receive processor 258, controller/processor 280, and/or the like) may determine the initial active uplink bandwidth part based at least in part on the RMSI, as described above.

In some aspects, determining the initial active uplink bandwidth part may include identifying a reference uplink frequency location of an uplink transmission of the UE; identifying an offset from the reference uplink frequency location; and identifying a physical resource block (PRB) frequency location of the initial active uplink bandwidth part to be at a frequency location at the offset from the reference uplink frequency location. In some aspects, the reference uplink frequency location comprises at least one of: an absolute radio frequency channel number indicated in the RMSI or a physical random access channel (PRACH) frequency location indicated in the RMSI.

In some aspects, identifying the PRB frequency location of the initial active uplink bandwidth part may include identifying a plurality of offsets in a RACH configuration, of the RACH procedure, included within the RMSI, wherein the plurality of offsets are associated with different initial active uplink bandwidth parts; and selecting the offset, from the plurality of offsets, for the PRB frequency location of the initial active uplink bandwidth part. In some aspects, selecting the offset from the plurality of offsets may include selecting the offset based at least in part on a setting of the UE associated with the RACH procedure.

In some aspects, the initial active uplink bandwidth part is determined based at least in part on a physical resource block (PRB) frequency location of the initial active uplink bandwidth part, wherein PRB frequency location is indicated in the RMSI. In some aspects, identifying the PRB frequency location of the initial active uplink bandwidth part may include identifying a plurality of reference uplink frequency locations in a RACH configuration, of the RACH procedure, included within the RMSI and selecting a reference uplink frequency location from the plurality of reference uplink frequency locations as the PRB frequency location of the initial active uplink bandwidth part. In some aspects, selecting the reference uplink frequency location from the plurality of reference uplink frequency locations may include selecting the reference uplink frequency location based at least in part on a setting of the UE associated with the RACH procedure. In some aspects, the setting comprises at least one of: a mapping or hash function based at least in part on a parameter of the UE, a synchronization signal block (SSB) index of a physical random access channel (PRACH) transmission of the RACH procedure, or a slot index of the PRACH transmission of the RACH procedure.

As further shown in FIG. 15, in some aspects, process 1500 may include using the initial active uplink bandwidth part for a random access channel (RACH) procedure between the UE and the BS (block 1530). For example, the UE (e.g., using antenna 252, MOD 254, TX MIMO processor 264, transmit processor 266, controller/processor 280, and/or the like) may use the initial active uplink bandwidth part for a RACH procedure between the UE and the BS, as described above.

In some aspects, the initial active uplink bandwidth part for the RACH procedure is used for at least one of: a physical random access channel (PRACH) of the RACH procedure, a physical uplink control channel (PUCCH) of the RACH procedure, or a physical uplink shared channel (PUSCH) of the RACH procedure.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based at least in part on" is intended to mean "based, at least in part, on" unless explicitly stated otherwise.

What is claimed is:

1. A method of wireless communication performed by a user equipment (UE), comprising:
   receiving remaining minimum system information (RMSI) from a base station (BS);
   identifying a plurality of reference uplink frequency locations in a random access channel (RACH) configuration, of a RACH procedure, included within the RMSI;
   selecting a reference uplink frequency location from the plurality of reference uplink frequency locations as a physical resource block (PRB) frequency location;
   determining an initial active uplink bandwidth part based at least in part on the PRB frequency location; and
   using the initial active uplink bandwidth part for the RACH procedure between the UE and the BS.

2. The method of claim 1, wherein selecting the reference uplink frequency location from the plurality of reference uplink frequency locations comprises:
   selecting the reference uplink frequency location based at least in part on a setting of the UE associated with the RACH procedure.

3. The method of claim 2, wherein the setting comprises at least one of:
   a mapping or hash function based at least in part on a parameter of the UE,
   a synchronization signal block (SSB) index of a physical random access channel (PRACH) transmission of the RACH procedure, or a slot index of the PRACH transmission of the RACH procedure.

4. The method of claim 1, wherein the RMSI includes a numerology of the initial active uplink bandwidth part,
wherein the numerology comprises at least one of:
a subcarrier spacing for the RACH procedure,
a cyclic prefix for the RACH procedure, or
a number of symbols per slot for the RACH procedure.

5. The method of claim 4, wherein the numerology is based at least in part on at least one of:
a numerology of a physical uplink shared channel (PUSCH) for a Message 3 (Msg.3) transmission of the RACH procedure, or
a numerology of a physical uplink control channel (PUCCH) for an acknowledgment (ACK) of a Message 4 (Msg.4) transmission of the RACH procedure.

6. The method of claim 1, wherein the RMSI includes at least one of:
a bandwidth of the initial active uplink bandwidth part,
a reference frequency of the initial active uplink bandwidth part,
an offset from the reference frequency of the initial active uplink bandwidth part, or
a numerology of the initial active uplink bandwidth part.

7. The method of claim 1, wherein the initial active uplink bandwidth part for the RACH procedure is used for at least one of:
a physical random access channel (PRACH) of the RACH procedure,
a physical uplink control channel (PUCCH) of the RACH procedure, or
a physical uplink shared channel (PUSCH) of the RACH procedure.

8. A user equipment comprising:
memory; and
one or more processors operatively coupled to the memory, the memory and the one or more processors configured to:
receive remaining minimum system information (RMSI) from a base station (BS);
identify a plurality of reference uplink frequency locations in random access channel (RACH) configuration, of a RACH procedure, included within the RMSI;
select a reference uplink frequency location from the plurality of reference uplink frequency locations as a physical resource block (PRB) frequency location;
determine an initial active uplink bandwidth part based at least in part on the PRB frequency location of the initial active uplink bandwidth part; and
use the initial active uplink bandwidth part for the RACH procedure between the user equipment and the BS.

9. The user equipment of claim 8, wherein the one or more processors, when selecting the reference uplink frequency location from the plurality of reference uplink frequency locations, are configured to:
select the reference uplink frequency location based at least in part on a setting of the user equipment associated with the RACH procedure.

10. The user equipment of claim 9, wherein the setting comprises at least one of:
a mapping or hash function based at least in part on a parameter of the user equipment,
a synchronization signal block (SSB) index of a physical random access channel (PRACH) transmission of the RACH procedure, or
a slot index of the PRACH transmission of the RACH procedure.

11. The user equipment of claim 8, wherein the RMSI includes a numerology of the initial active uplink bandwidth part,
wherein the numerology comprises at least one of:
a subcarrier spacing for the RACH procedure,
a cyclic prefix for the RACH procedure, or
a number of symbols per slot for the RACH procedure.

12. The user equipment of claim 11, wherein the numerology is based at least in part on at least one of:
a numerology of a physical uplink shared channel (PUSCH) for a Message 3 (Msg.3) transmission of the RACH procedure, or
a numerology of a physical uplink control channel (PUCCH) for an acknowledgment (ACK) of a Message 4 (Msg.4) transmission of the RACH procedure.

13. The user equipment of claim 8, wherein the RMSI includes at least one of:
a bandwidth of the initial active uplink bandwidth part,
a reference frequency of the initial active uplink bandwidth part,
an offset from the reference frequency of the initial active uplink bandwidth part, or
a numerology of the initial active uplink bandwidth part.

14. The user equipment of claim 8, wherein the initial active uplink bandwidth part for the RACH procedure is used for at least one of:
a physical random access channel (PRACH) of the RACH procedure,
a physical uplink control channel (PUCCH) of the RACH procedure, or
a physical uplink shared channel (PUSCH) of the RACH procedure.

15. A method of wireless communication performed by a base station (BS), comprising:
transmitting, to a user equipment (UE), a random access channel (RACH) configuration within remaining minimum system information (RMSI),
the RACH configuration to be used to establish an initial active uplink bandwidth part for the UE,
the RACH configuration including information regarding a plurality of reference uplink frequency locations,
the initial active uplink bandwidth part being determined based at least in part on a reference uplink frequency location selected from the plurality of reference uplink frequency locations as a physical resource block (PRB) frequency location, and
the initial active uplink bandwidth part to be used for a RACH procedure between the BS and the UE; and
establishing an uplink PRB grid for the RACH procedure based at least in part on the initial active uplink bandwidth part.

16. The method of claim 15, wherein the uplink PRB grid is established based at least in part on a numerology of the initial active uplink bandwidth part.

17. The method of claim 16, wherein the numerology indicates at least one of:
a subcarrier spacing for the RACH procedure,
a cyclic prefix for the RACH procedure, or
a number of symbols per slot for the RACH procedure.

18. The method of claim 16, wherein the numerology is based at least in part on at least one of:

a numerology of a physical uplink shared channel (PUSCH) for a Message 3 (Msg.3) transmission of the RACH procedure, or a numerology of a physical uplink control channel (PUCCH) for an acknowledgment (ACK) of a Message 4 (Msg.4) transmission of the RACH procedure.

19. The method of claim 15, wherein the reference uplink frequency location is selected based at least in part on a setting of the UE.

20. The method of claim 15, wherein the setting comprises at least one of:
   a mapping or hash function based at least in part on a parameter of the UE,
   a synchronization signal block (SSB) index of a physical random access channel (PRACH) transmission of the RACH procedure, or
   a slot index of the PRACH transmission of the RACH procedure.

21. The method of claim 15, wherein the RMSI includes at least one of:
   a bandwidth of the initial active uplink bandwidth part,
   a reference frequency of the initial active uplink bandwidth part,
   an offset from the reference frequency of the initial active uplink bandwidth part, or
   a numerology of the initial active uplink bandwidth part.

22. The method of claim 15, wherein the initial active uplink bandwidth part is to be used for a physical random access channel (PRACH) of the RACH procedure.

23. The method of claim 15, wherein the initial active uplink bandwidth part is to be used for at least one of:
   a physical uplink control channel (PUCCH) of the RACH procedure, or
   a physical uplink shared channel (PUSCH) of the RACH procedure.

24. A base station (BS) comprising:
   memory; and
   one or more processors operatively coupled to the memory, the memory and the one or more processors configured to:
      transmit, to a user equipment (UE), a random access channel (RACH) configuration within remaining minimum system information (RMSI),
         wherein the RACH configuration is to be used to establish an initial active uplink bandwidth part for the UE,
            the RACH configuration including information regarding a plurality of reference uplink frequency locations,
            the initial active uplink bandwidth part being determined based at least in part on a reference uplink frequency location selected from the plurality of reference uplink frequency locations as a physical resource block (PRB) frequency location, and
            the initial active uplink bandwidth part to be used for a RACH procedure between the base station and the UE; and
      establish an uplink PRB grid for the RACH procedure based at least in part on the initial active uplink bandwidth part.

25. The base station of claim 24, wherein the uplink PRB grid is established based at least in part on a numerology of the initial active uplink bandwidth part,
   wherein the numerology indicates at least one of:
      a subcarrier spacing for the RACH procedure,
      a cyclic prefix for the RACH procedure, or
      a number of symbols per slot for the RACH procedure.

26. The base station of claim 25, wherein the numerology is based at least in part on at least one of:
   a numerology of a physical uplink shared channel (PUSCH) for a Message 3 (Msg.3) transmission of the RACH procedure, or
   a numerology of a physical uplink control channel (PUCCH) for an acknowledgment (ACK) of a Message 4 (Msg.4) transmission of the RACH procedure.

27. The base station of claim 24, wherein the reference uplink frequency location is selected based at least in part on a setting of the UE.

28. The base station of claim 27, wherein the setting comprises at least one of:
   a mapping or hash function based at least in part on a parameter of the UE,
   a synchronization signal block (SSB) index of a physical random access channel (PRACH) transmission of the RACH procedure, or
   a slot index of the PRACH transmission of the RACH procedure.

29. The base station of claim 24, wherein the RMSI includes at least one of:
   a bandwidth of the initial active uplink bandwidth part,
   a reference frequency of the initial active uplink bandwidth part,
   an offset from the reference frequency of the initial active uplink bandwidth part, or
   a numerology of the initial active uplink bandwidth part.

30. The base station of claim 24, wherein the initial active uplink bandwidth part is to be used for at least one of:
   a physical random access channel (PRACH) of the RACH procedure,
   a physical uplink control channel (PUCCH) of the RACH procedure, or
   a physical uplink shared channel (PUSCH) of the RACH procedure.

* * * * *